United States Patent
Sugaya (10) Patent No.: US 8,479,081 B2
(45) Date of Patent: Jul. 2, 2013

(54) METHOD FOR VISUALLY CONFIRMING A RELATIONSHIP BETWEEN AN EDITED PACKET AND SERIAL DATA

(75) Inventor: Kazunao Sugaya, Shizuoka (JP)

(73) Assignee: Tektronix, Inc., Beaverton, OR (US)

(*) Notice: Subject to any disclaimer, the term of this patent is extended or adjusted under 35 U.S.C. 154(b) by 483 days.

(21) Appl. No.: 12/822,822

(22) Filed: Jun. 24, 2010

(65) Prior Publication Data

US 2011/0004818 A1    Jan. 6, 2011

(30) Foreign Application Priority Data

Jul. 1, 2009    (JP) .................................. 2009-157008

(51) Int. Cl.
*H03M 13/00*    (2006.01)
(52) U.S. Cl.
USPC ............. 714/776; 714/48; 714/738; 714/807; 345/440.1; D10/76; 370/252; 375/224

(58) Field of Classification Search
None
See application file for complete search history.

(56) References Cited

U.S. PATENT DOCUMENTS

| | | | |
|---|---|---|---|
| 8,085,812 B2 * | 12/2011 | Frishberg | 370/469 |
| 2007/0211644 A1 * | 9/2007 | Ottamalika et al. | 370/252 |
| 2007/0223569 A1 * | 9/2007 | Obata | 375/228 |
| 2008/0310490 A1 * | 12/2008 | Jitsuno et al. | 375/227 |
| 2008/0313516 A1 * | 12/2008 | Raja et al. | 714/738 |
| 2009/0043803 A1 * | 2/2009 | Frishberg et al. | 707/102 |

* cited by examiner

*Primary Examiner* — John Trimmings
(74) *Attorney, Agent, or Firm* — William K. Bucher (57) ABSTRACT

A user may easily confirm a relationship between an edited packet and the output serial data derived from the edited packet. The user may edit a packet with known method (step 104) to display a packet structure of the edited packet (step 106). A signal generator converts the packet to serial data through striping, scramble and 8b/10b conversion to display a serial data bar corresponding to the serial data derived from the packet (step 116). The user may designate a range on the serial data bar to distinctively display portions of the packet structure corresponding to the designated range (step 120).

11 Claims, 10 Drawing Sheets

Packet Edit

| | Label | Block / Sub Sequence | Repeat | Go To |
|---|---|---|---|---|
| 1 | STP | SUB_K_STP | 1 | |
| 2 | SEQNUM | SEQNUM | 1 | |
| 3 | HEADER | SUB_PACKET_HEADER | 1 | |
| 4 | DATA_PAYLOAD | DATA_PAYLOAD | 4 | |
| 5 | ECRC | ECRC | 1 | |
| 6 | LCRC | LCRC | 1 | |
| 7 | END | SUB_K_END | 1 | STP |

METHOD FOR VISUALLY CONFIRMING A RELATIONSHIP BETWEEN AN EDITED PACKET AND SERIAL DATA

BACKGROUND OF THE INVENTION

Figure 1:
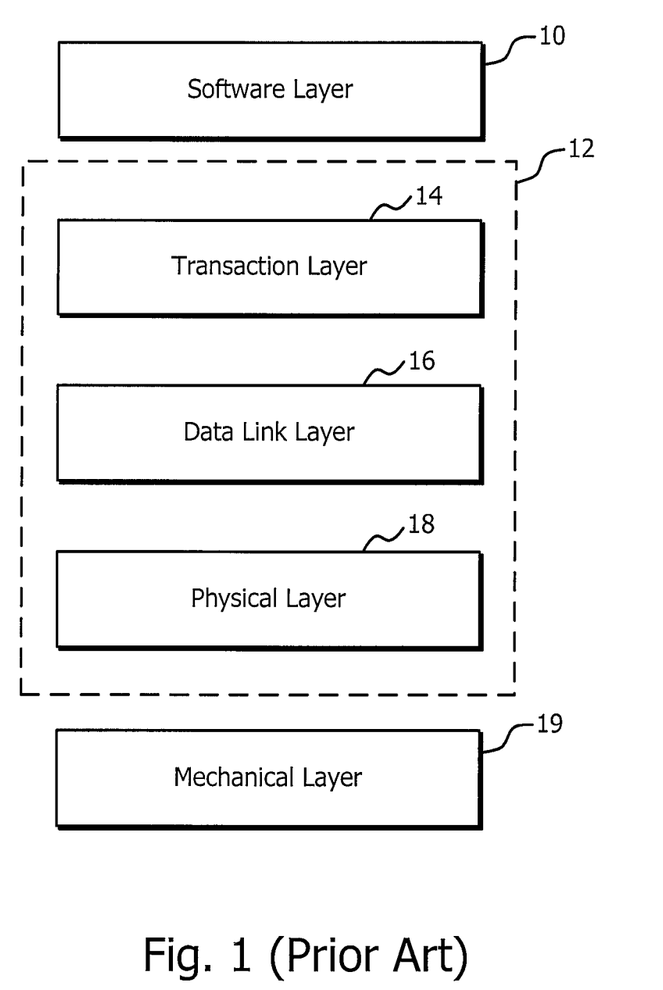
FIG. 1 is a layer structure of PCI Express.

This invention relates to editing packets for fast serial interfaces and more specifically a method for easily confirming corresponding relationships between an edited packet and the serial data derived from the edited packet PCI Express has become popular as an interface that enables faster data communication. It adopts packed-based protocol and serial communication as an electrical interface. FIG. 1 shows a structure of PCI Express 12. A PCI Express software layer 10 has compatibility with legacy PCI software, and software working on PCI, e.g. drivers and the like, works in a system using PCI Express. In creating transmission data, a transaction layer 14 receives data from the software layer 10 and generates a transaction layer packet (TLP) that is provided to a data link layer 16. The data link layer 16 adds a data link packet (DLLP) to the TLP and provides it to a physical layer 18. The physical layer 18 adds a physical layer packet (ordered sets) and converts the combined packets into electrical signals for transfer. A mechanical layer 19, such as an electrical socket, circuit board traces and the like, is provided as a mechanical structure depending on an application. In case of receiving data, the flow of the processes is in reverse, i.e. the physical layer receives an electrical signal from a mechanical layer and converts it into a packet that is provided to the transaction layer via the date link layer. As described, each layer communicates the packet with the corresponding layer of the communication device.

Figure 2:
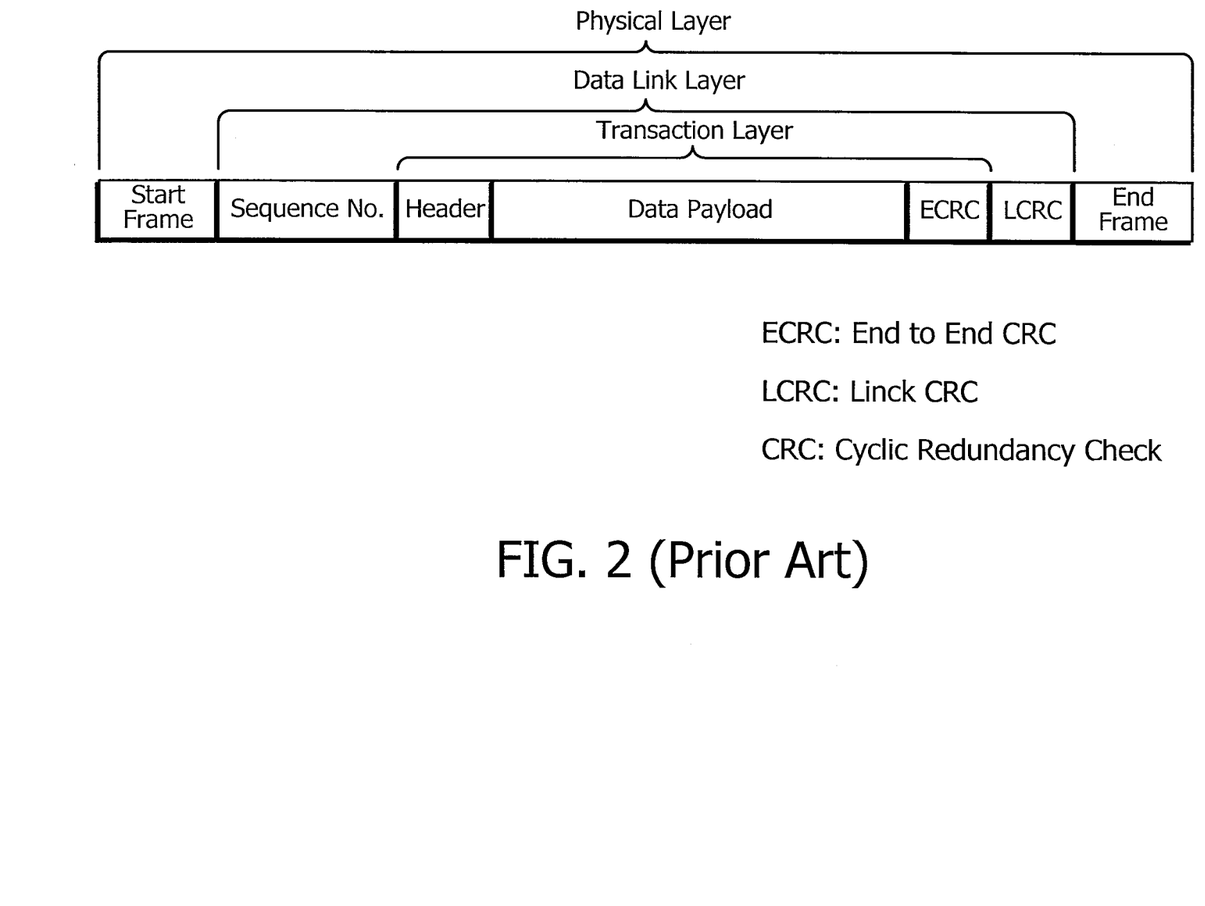
FIG. 2 is an exemplary structure of a packet.

FIG. 2 shows a structure of a complete PCI Express packet wherein sub-packets are gradually added to the outsides as it advances layer by layer from the transaction layer to the physical layer. ECRC (End to end CRC), also called as TLP Digest, is optionally added in the transaction layer and used for determining whether there is an error of the TLP with CRC (Cyclic Redundancy Check). The data link layer adds LCRC (Link CRC) to assure reliability of the TLP that is used to detect an error. If an error is detected, the TLP may be re-transmitted to recover the error. A sequence number is a serial number of the packet. The receiving side detects duplication or lack of the TLP using the sequence number. The physical layer adds K characters (control codes), SDP (Start of DLLP) or STP (Start of TLP), to the packet from the data link layer as a starting marker (start frame) at the beginning of the packet. It also adds "END" character as an end frame at the end of the packet.

Figure 3:
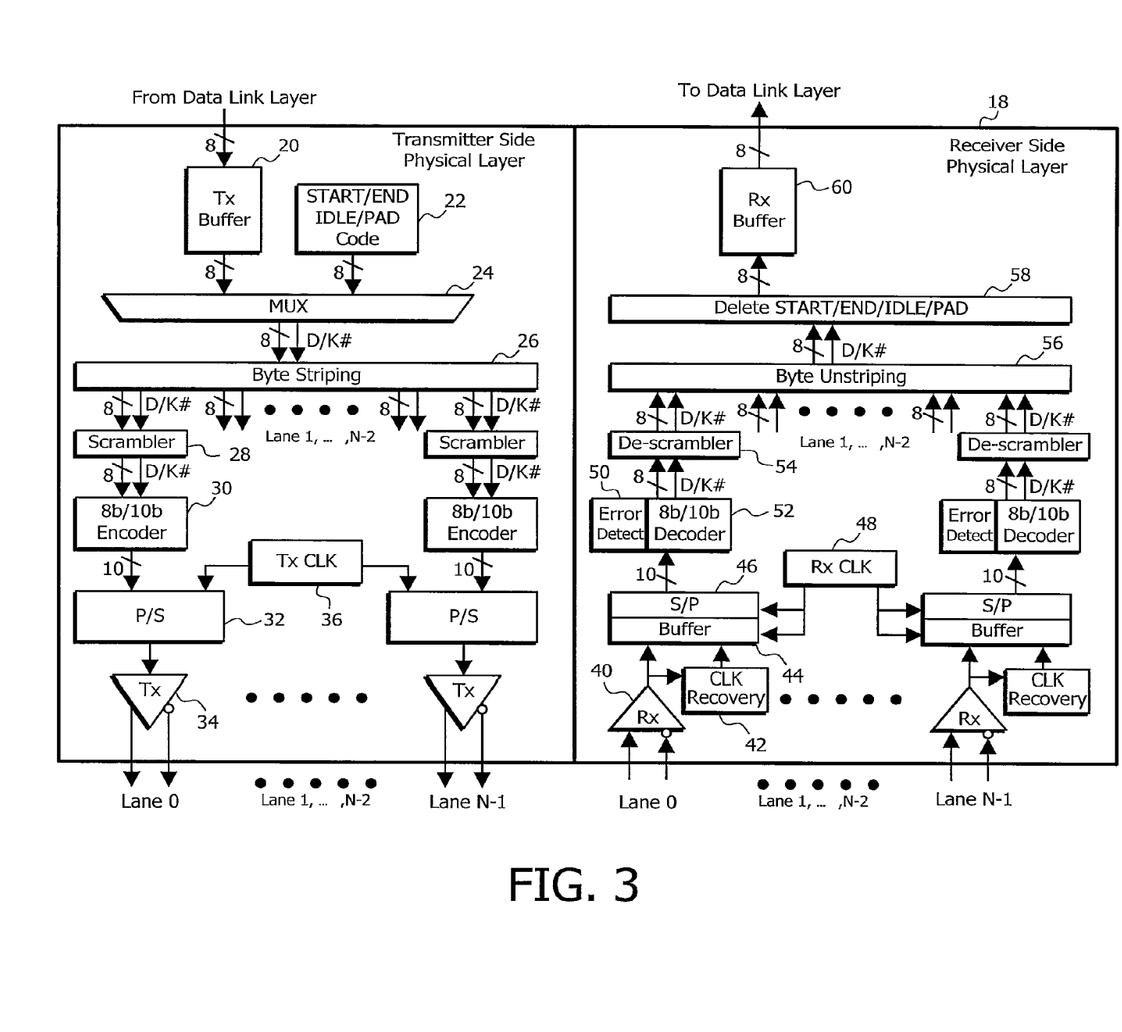
FIG. 3 is a detailed block diagram of a physical layer of PCI Express.

FIG. 3 is an exemplary block diagram of the physical layer that has transmitter and receiver sides. The transmitter side has a Tx buffer 20 that receives the packet from the data link layer. A multiplexer 24 adds the K characters to the packet. The byte striping 26 distributes the data depending on the number of lanes. Scramblers 28 may be liner feedback shift registers (LFSRs) that randomizes the data pattern according to an equation of $G(X)=X^{16}+X^5+X^4+X^3+1$. This is for preventing EMI (electromagnetic interference) that may be concentrated at a particular frequency. The scramblers 28 scramble D characters included in the TLP and DLLP but not K characters so that a receiving device may easily recognize the K characters.

8b/10b encoders 30 uses conversion tables to convert 8 bit data patterns into 10 bit data patterns wherein the encoded 10 bit data patterns have no more than five 1 s or 0 s in a row. The shorter series of 1 or 0 cycles makes it easier to recover a clock from the data at the receiver side. Note that the PCI Express specification calls 8 bit data before encoding a "Character" and 10 bit data after encoding a "Symbol".

Parallel to serial converters 32 convert the 10 bit data from the 8b/10b encoders 30 into serial data according to a Tx clock. The serial data is provided as differential electric signals from Tx drivers 34. Each lane has four transmission lines of two transmitter lines and two receiver lines. In the transmitter line, higher frequency components are attenuated more than lower frequency components. Then, the output electric signals from the driver 34 are de-emphasized for reducing errors during the transmission.

At the receiver side, receivers 40 receive the differential signals and clock recovery circuits 42 recover clocks (i.e. Tx clocks) from the received signals. Buffers 44 extract data from the differential signals according to the recovered clocks, and provide it to serial to parallel converters 46 according to an Rx clock of the receiver side. Most of the following processes are reverse version of the transmitter side of the physical layer described above.

A signal generator is an apparatus that can store digital waveform data in the storage device such as a memory, hard disk drive (HDD), etc. The digital waveform data is converted analog signal output. The digital waveform data may be previously stored data defined in the PCI Express standards or use defined digital waveform data. One application for a signal generator is in developing a new electronic apparatus. The signal generator may provide an expected output signal from an uncompleted circuit block of the apparatus to a circuit block following the uncompleted circuit block to confirm whether the following circuit block works as expects. Another application is a durability test against jitter or distortions where the signal generator provides a signal including intentional jitter or distortions to a circuit under test. Further, the signal generator may be used for measuring characteristics of a fast serial interface such as PCI Express, etc. The signal generator provides a signal having waveform patterns suitable for the characteristic testing and an oscilloscope is used to receive an output from the transmission lines to measure the characteristics with eye pattern display, etc. AWG7000B series signal generators, manufactured and sold by Tektronix, Inc., Beaverton, Oreg., are such signal generators.

Figure 4:
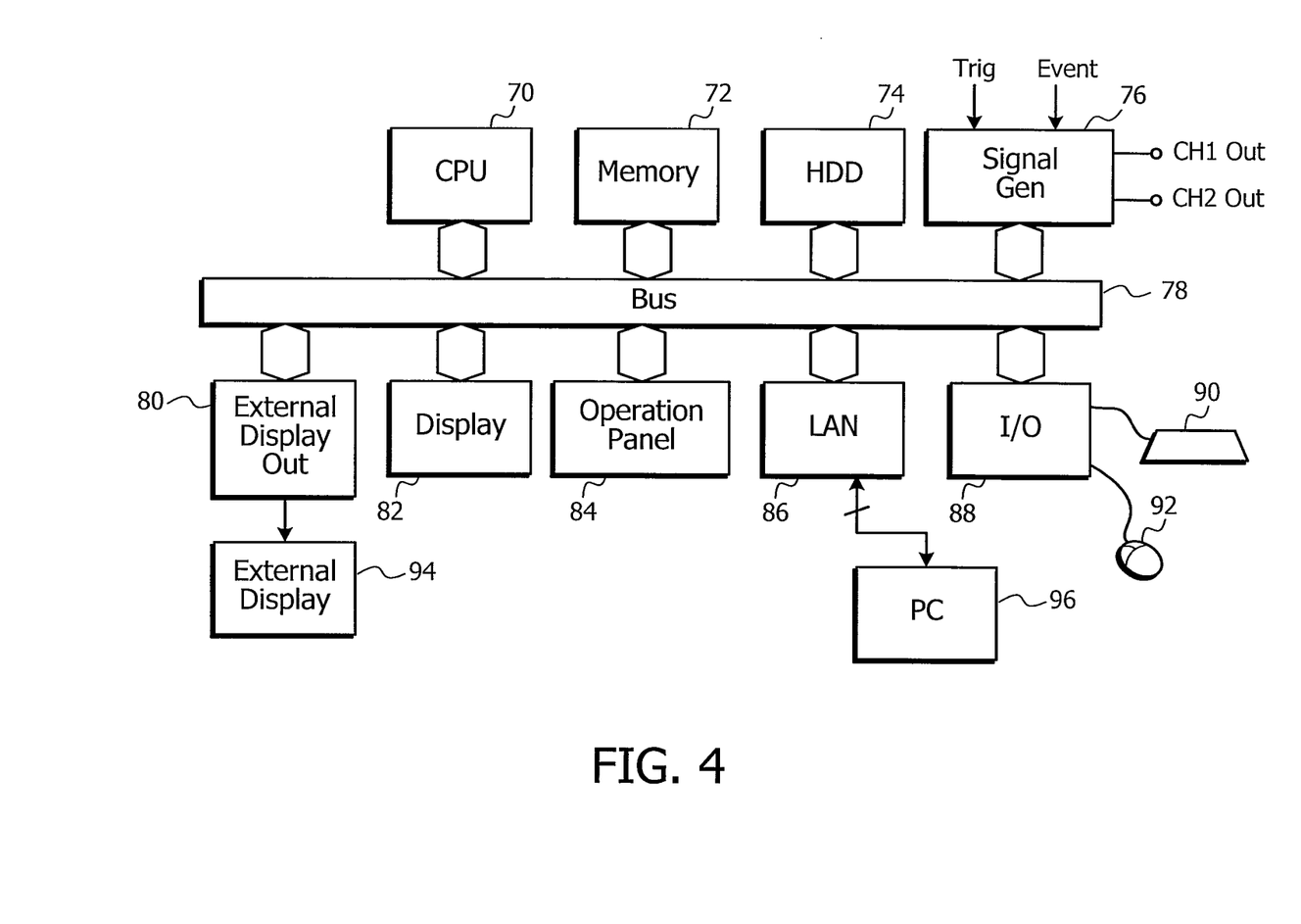
FIG. 4 is an exemplary block diagram of a signal generator.

FIG. 4 is an exemplary block diagram of a signal generator. A CPU (Central Processing Unit) 70 controls the signal generator system according to programs stored in a hard disk drive (HDD) 74. The HDD 74 may also be used for storing large amounts of data, such as waveform generation software, digital waveform data and the like. A memory 72, such as RAM memory, is used for a work area for the CPU 70 to read programs from the storage device. A user can set up the signal generator via an operation panel 84 that includes keys, knobs, and the like. A display 82 provides visual information relating to signal patterns and user settings. An external display output circuit 80 provides a video output which may be connected to an external display 94 for providing a larger display area in addition to the built-in display 82 of the signal generator. A signal generation circuit 76 generates signal patterns based on user defined parameters. In this example, it has two channel outputs and inputs for trigger and event signals. Receipt of these signals enables conditional actions. An input/output port 88 is used for connecting an external keyboard 90, a pointing device 92, such as a mouse, and the like to the signal generator. The external keyboard 90 and/or pointing device 92 may be included as parts of the operation means of the signal generator. These blocks are coupled together via a bus 78. A LAN (Local Area Network) interface may be connected to the bus 78 to couple the signal generator to an external PC 96. The external PC 96 allows a user to remotely control the signal generator as desired.

A waveform of an electric signal that the user desires is stored in the memory or HDD as waveform data. The waveform data may be edited with waveform editing software working on a PC as is known. ArbExpress, manufactured and sold by Tektronix, Inc. is such a waveform editing software. U.S. Application Publication 2008/0313516 discloses waveform data edit with waveform editing software.

It would be convenient for measuring characteristics or performing compliance testing of a PCI Express receiver if a signal generator provides differential signals that replicate the signal outputs of the transmitter drivers of the physical layer of PCI Express transmitter. The signal generator can easily generate arbitrary signals having different patterns and intentional jitter, and provide them according to a programmed sequence.

Figure 5:
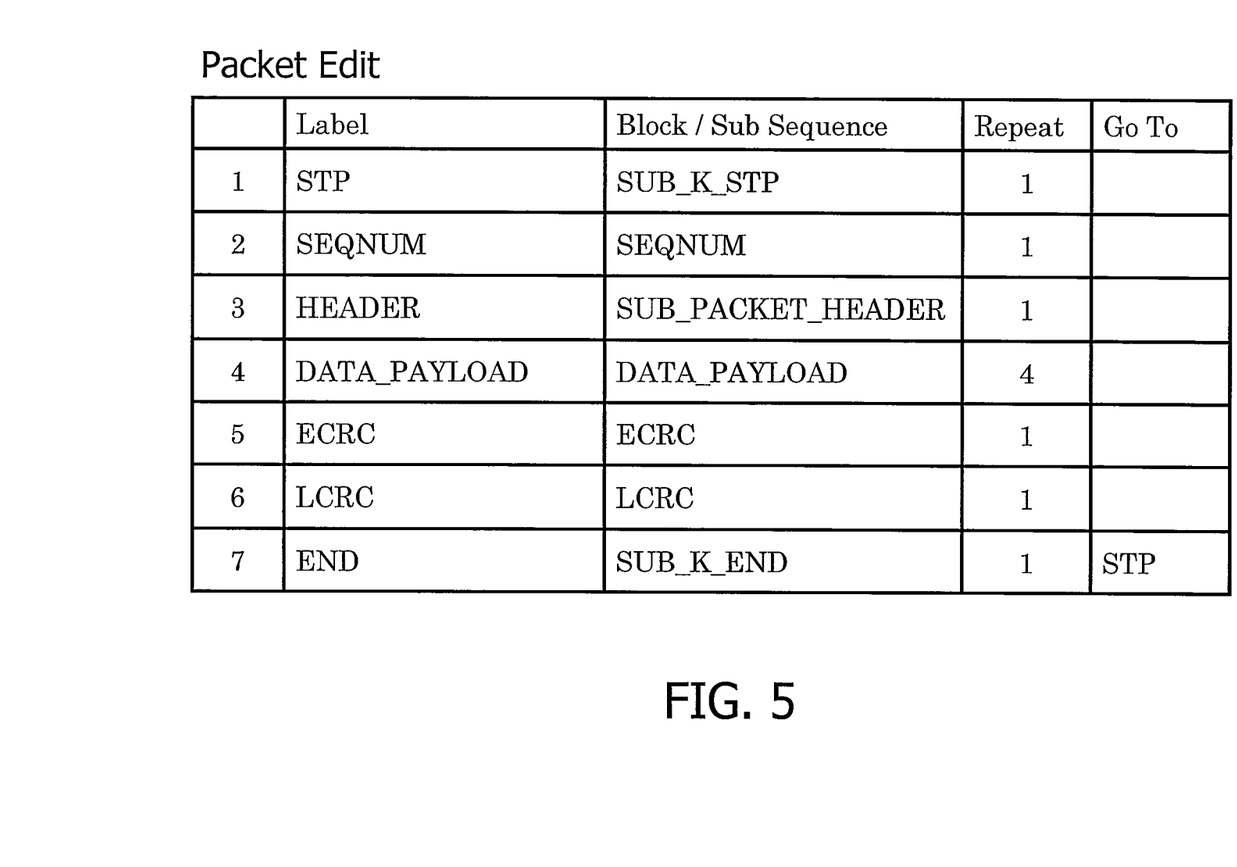
FIG. 5 is a display for editing a packet using a table format.

FIG. 5 shows a screen display of table for use in packet editing. The table may be displayed on a display screen of the display device 82 of the signal generator. A user may edit the packet using the operation panel 84, keyboard 90, mouse 92, for example. A "Label" column shows the elements of the packet. The user may input names of packet files that the user wants to set to the respective elements in a "Block/Sub Sequence" column. The packet files may be previously stored in a library and the user may select desired packet files from the library. Some of the packet files are defined by the specification but the user may revise the files prepared in the library. A "Repeat" column is used to designate the number of times the packet file data repeats. A "Go To" column is used to designate where to jump following the packet file data.

The signal generator generates electric signals representative of the user defined packets. The electrical signals are coupled to transmission lines of the PCI Express with the signals at the output of the transmission lines being observed using an oscilloscope displaying eye patterns. This allows measuring characteristics of the transmission lines when various signal patterns are provided.

It is not easy for the user to confirm relationship between the packet and the output serial pattern when the table format as shown in FIG. 5 is used for editing the packet. If an error occurs in the serial pattern, it would be difficult to identify which element of the packet causes the error. Therefore, what is desired is to provide a way to easily confirm the relationship between an edited packet and the actual output packet data derived from the edited packet.

SUMMARY OF THE INVENTION

The present invention relates to a method used in, for example, a signal generator for confirming a relationship between an edited packet for a serial interface and the serial data derived from the edited packet. The method comprises the steps of: editing a desired packet; displaying a packet structure of the edited packet; converting the packet into serial data; displaying a serial data bar corresponding to the serial data derived from the packet; designating a portion of the serial data bar; and distinctively displaying portions of the packet structure corresponding to the designated portion. This allows a user to easily confirm the relationship between the edited packet and the serial data derived from the edited packet visually.

Alternatively, an arbitrary portion of the packet structure may be designated and portions of the serial data bar corresponding to the designated portion may be displayed distinctively. The edited packet may be checked with CRC (Cyclic Redundancy Check) to designate a portion of the edited packet having an error as the designated portion.

The objects, advantages and other novel features of the present invention are apparent from the following detailed description when read in conjunction with the appended claims and attached drawings.

DETAILED DESCRIPTION OF THE INVENTION

Figure 6:
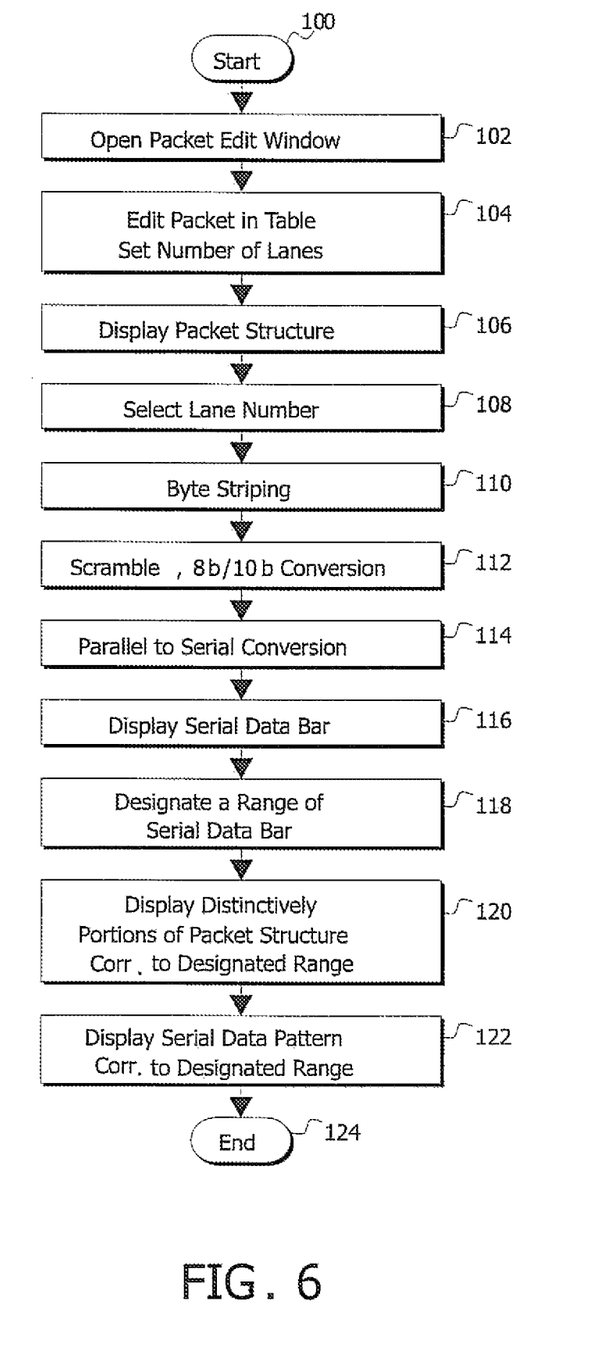
FIG. 6 is a flowchart for confirming a relationship between an edited packet and corresponding serial data according to an embodiment of the present invention.

The present invention relates to a method for confirming relationships between an edited packet and the corresponding serial data for a serial interface. FIG. 6 shows an exemplary flowchart according to an embodiment of the present invention. The procedures may be performed using the signal generator as shown in FIG. 4. The signal generator uses software controlled procedures for conducting equivalent processes as PCI Express and generating output signals corresponding to the edited packet.

Figure 7:
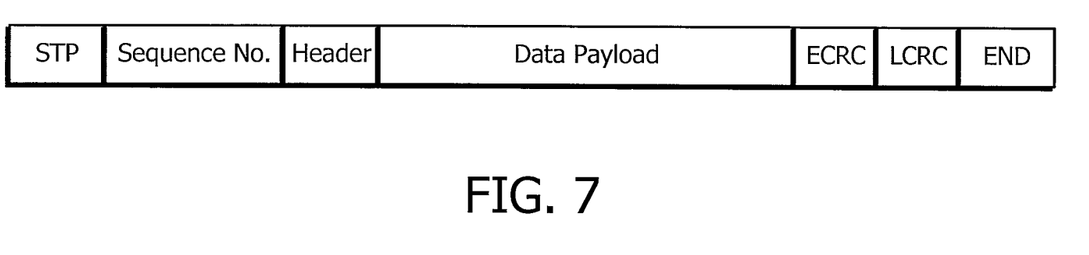
FIG. 7 is a display example of an edited packet.

A user may open a packet edit window with operation of the mouse 92, etc. (step 102). In a step 104, the user may edit the packet using a table format as described with FIG. 5 and set the number of lanes. Then, the display device 82 displays a packet structure corresponding to the edited packet as shown in FIG. 7 (step 106). The packet structure corresponds to outputs of the multiplexers 24 of FIG. 3. The user selects a lane number of the serial data that the user would like to check in the following process (step 108) wherein the user may alternatively select two or more numbers of the lanes. The signal generator conducts a byte striping process on the edited packet (step 110). It also performs the scrambling function and 8b/10b conversion (step 112), and parallel to serial conversion (step 114) on the selected data of the lane number(s). In a step 116, a serial data bar temporally-corresponding to the generated serial data is displayed.

Figure 8:
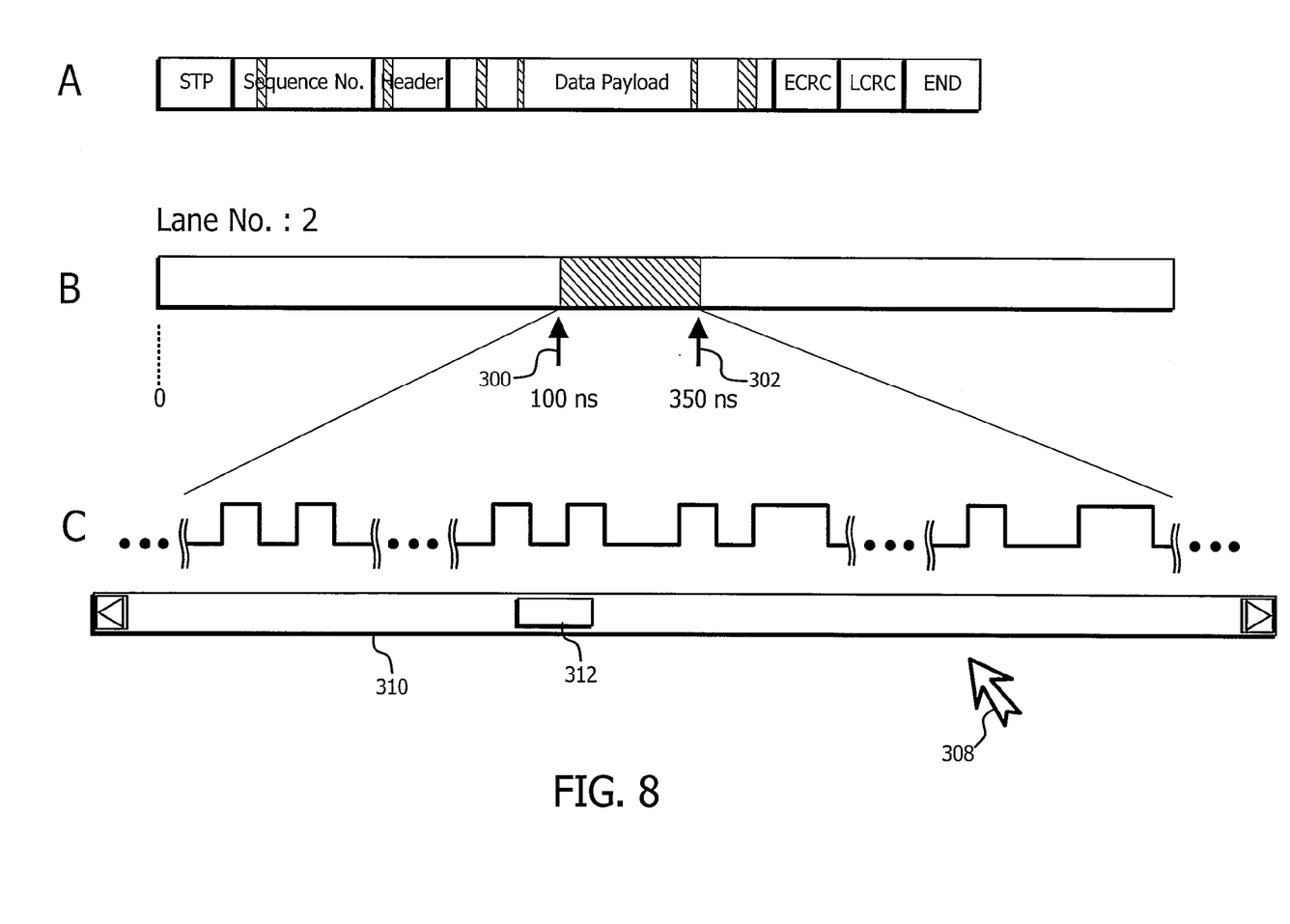
FIGS. 8A-8C are examples of displaying a relationship between an edited packet and corresponding serial data according to an embodiment of the present invention.

FIG. 8B is an example of the display serial data bar. First and second time cursors 300 and 302 are displayed with the serial data bar. Times values for the time cursors are displayed near the respective time cursors and are calculated from a 0 second start of the serial data bar. The lane number is displayed near the serial data bar. The user may change the positions of the time cursors by dragging them with a mouse cursor 308. The positions of the time cursors can also be changed by a symbol unit of the data rather than by continuous variable changes. FIG. 8 shows an example of only one lane but if multiple lanes are selected another window may be provided in the display screen to display the contents of the respective lanes as shown in FIGS. 8B and 8C.

The portion or range designated with the first and second time cursors 300 and 302 may be displayed distinctively. The designated range is shown as a hatched pattern (a different pattern from the other portions) in FIG. 8B but may be displayed in different color or intensity from the other portions. The range may be designated with the mouse cursor 308 in place of the time cursors using known click and drag operations (step 118). Portions of the packet corresponding to the designated range are displayed distinctively from the other portions (step 120) as representatively shown by the hatched patterns in the packet structure of FIG. 8A. Note that the hatched patterns in FIG. 8A are discrete since FIG. 8A shows the packet structure before the processes of striping, scramble and 8b/10b conversion and FIG. 8B shows the serial data bar corresponding to the serial data after such processes. Logical patterns of the serial data corresponding to the designated range may be displayed with a scroll bar 310 (step 122) as shown in FIG. 8C. A desired portion of the serial data pattern may be displayed by dragging a slider 312 with the mouse cursor 308. The serial data corresponds to an output of one of the parallel to serial converters 32 shown in FIG. 3. The order of the step 120 and 122 may be exchanged.

The display described above allows a user to visually confirm corresponding relationships between the edited packet and the serial data output from the signal generator before de-emphasis. This allows the user to determine if revisions are necessity to the edited packet, which makes the packet edit processes efficient.

Figure 9:
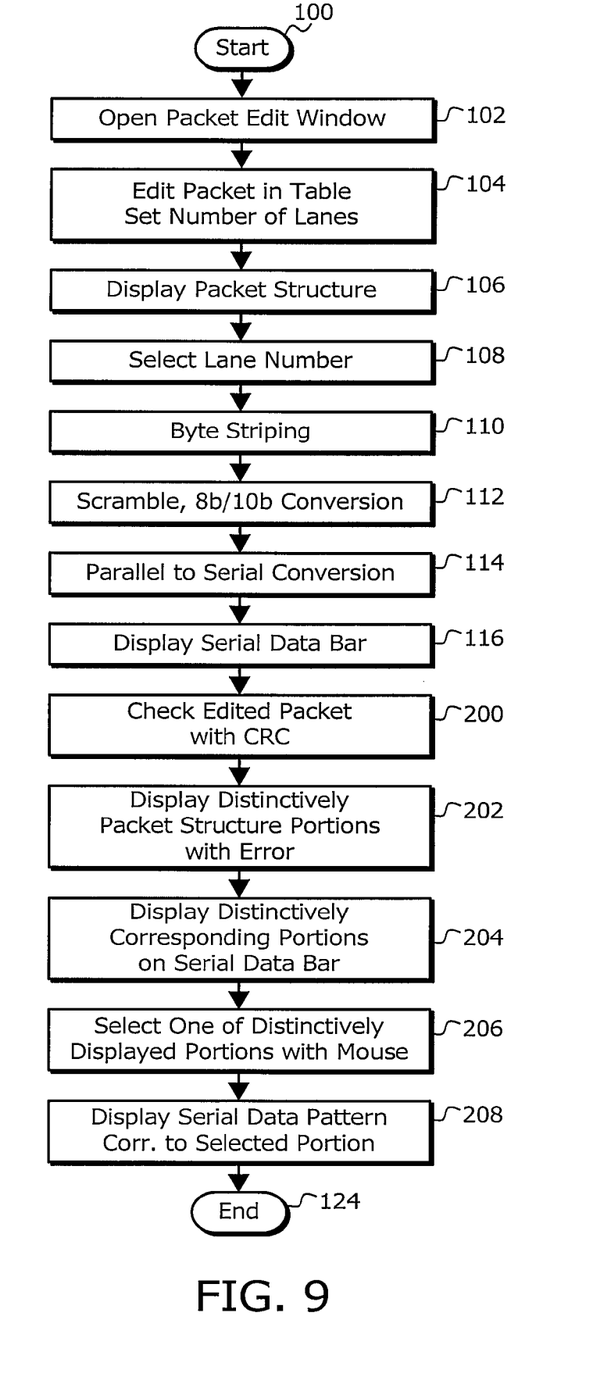
FIG. 9 is a flowchart for confirming a relationship between an edited packet and corresponding serial data according to another embodiment of the present invention.

FIG. 9 is a flowchart of another embodiment according to the present invention. Steps corresponding to those of FIG. 6 have the same reference numbers and the details of these steps are not repeated. In a step 200, the edited packed is checked using the CRC that may be ECRC or LCRC. If the edited packet has errors, elements of the packet having the errors are displayed distinctively from the other elements as shown in FIG. 10A (step 202). Further, the portions corresponding to the packet elements having the errors may be displayed distinctively from the others on the serial data bar as shown in FIG. 10B (step 204). The user may select one of the distinctively displayed portions with the mouse cursor 308 to display the serial data pattern of the selected portion on the serial data bar (step 206). The selected portion may be displayed as it is easily recognized to be selected (cross-hatched in FIG. 8B, for example). Then, the serial data pattern corresponding to the selected portion is displayed as shown in FIG. 10C (step 208). This allows the user to confirm what serial data pattern is provided when the packet has the errors.

Figure 10:
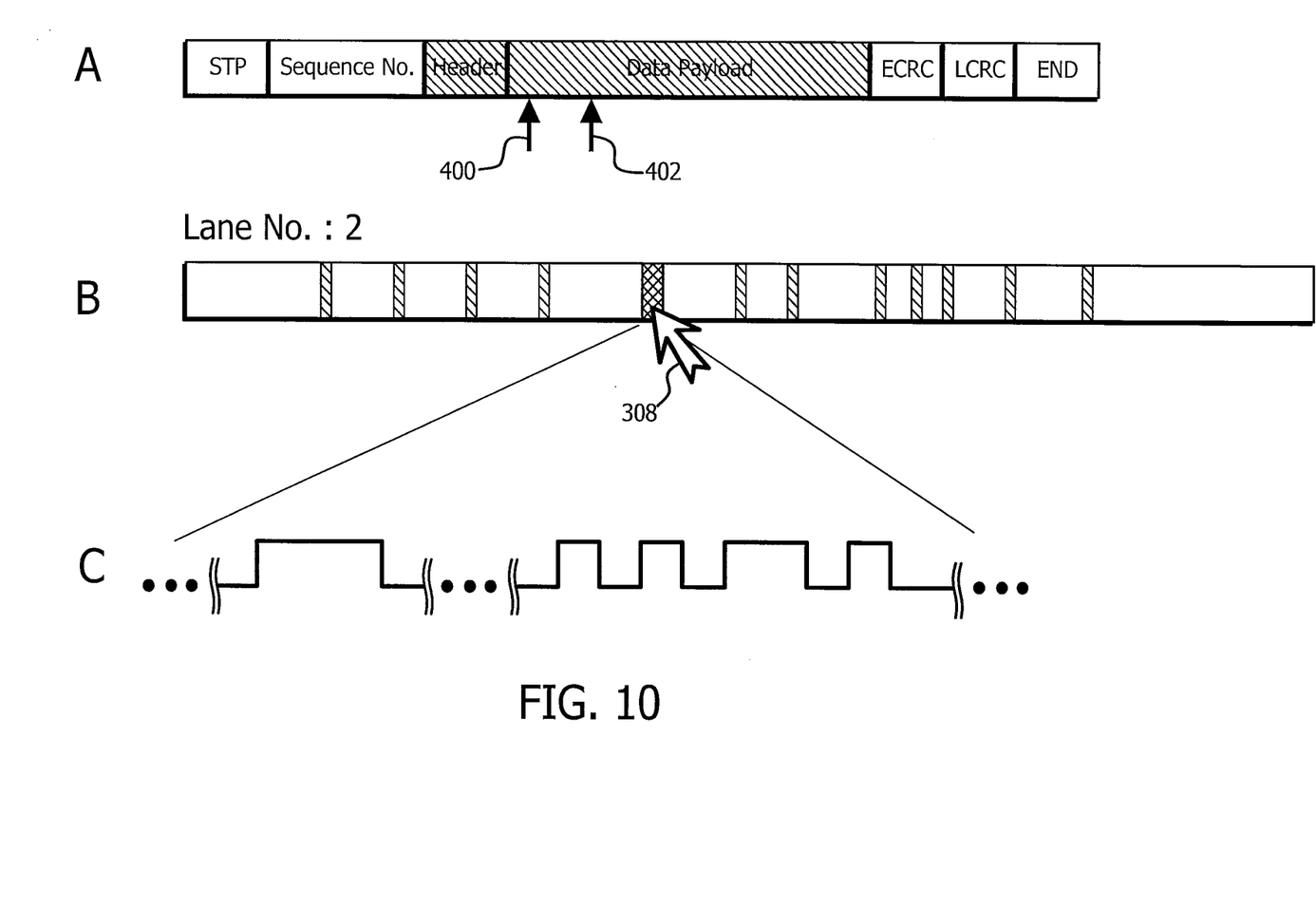
FIGS. 10A-10C are examples of displaying a relationship between an edited packet and corresponding serial data according to the embodiment shown in FIG. 9.

Although the invention has been disclosed in terms of the preferred and alternative embodiments disclosed herein, those skilled in the art will appreciate that modifications and improvements may be made without departing from the scope of the invention. For example, an arbitrary range of the packet structure may be selected with first and second packet cursors 400 and 402 as shown in FIG. 10, or a desired packet element may be selected with the mouse cursor 308 by clicking, and then the portions corresponding to the selected range or element on the serial data bar may be displayed distinctively. Further, one of the distinctively displayed portions on the serial data bar may be selected with the mouse cursor 308 to display the serial data pattern corresponding to the selected portion. All of the distinctive display of the portion/element described above may be realized with different color or intensity from the other portions/elements. The preferred embodiments have been described based on PCI Express but the present invention is not limited to just PCI Express and may be implemented for other serial data standards.

What is claimed is:

1. A method of using a signal generator for confirming a corresponding relationship between an edited packet for a serial interface and serial data derived from the edited packet comprising the steps of:
    editing a packet;
    displaying a packet structure of the edited packet;
    converting the edited packet to serial data;
    displaying a serial data bar corresponding to the serial data;
    designating an arbitrary portion of the serial data bar; and
    distinctively displaying portions of the packet structure corresponding to the designated arbitrary portion.

2. The method as recited in claim 1 wherein the designated arbitrary portion is designated with time cursors.

3. The method as recited in claim 2 wherein the positions of the time cursors may be changed by a symbol unit of the serial data.

4. The method as recited in claim 2 wherein times of the respective time cursors from the beginning of the serial data bar are displayed.

5. The method as recited in claim 1 further comprising the step of displaying serial data pattern corresponding to the designated arbitrary portion.

6. The method as recited in claim 1 wherein the designated arbitrary portion of the serial data bar is displayed.

7. A method of using a signal generator for confirming a corresponding relationship between an edited packet for a serial interface and serial data derived from the edited packet comprising the steps of:
    editing a packet;
    displaying a packet structure of the edited packet;
    converting the edited packet to serial data;
    displaying a serial data bar corresponding to the serial data;
    designating an arbitrary portion of the packet structure; and
    distinctly displaying portions of the serial data bar corresponding to the designated portion.

8. The method as recited in claim 7 wherein the step of designating the arbitrary portion of the packet structure comprising the step of checking the edited packet with CRC (Cyclic Redundancy Check) to designate a portion of the edited packet having an error as the designated portion.

9. The method as recited in claim 7 wherein the designated portion of the packet structure is designated with cursors.

10. The method as recited in claim 7 wherein the designated portion of the packet structure is displayed distinctively.

11. The method as recited in claim 7 further comprising the steps of selecting one of the portions of the serial data bar corresponding to the designated portion of the packet structure and displaying serial data pattern corresponding to the selected portion.

* * * * *